Aug. 25, 1931.  E. PEARSON  1,820,319
AUTOMATIC SYNCHRONIZER
Filed Feb. 26, 1924
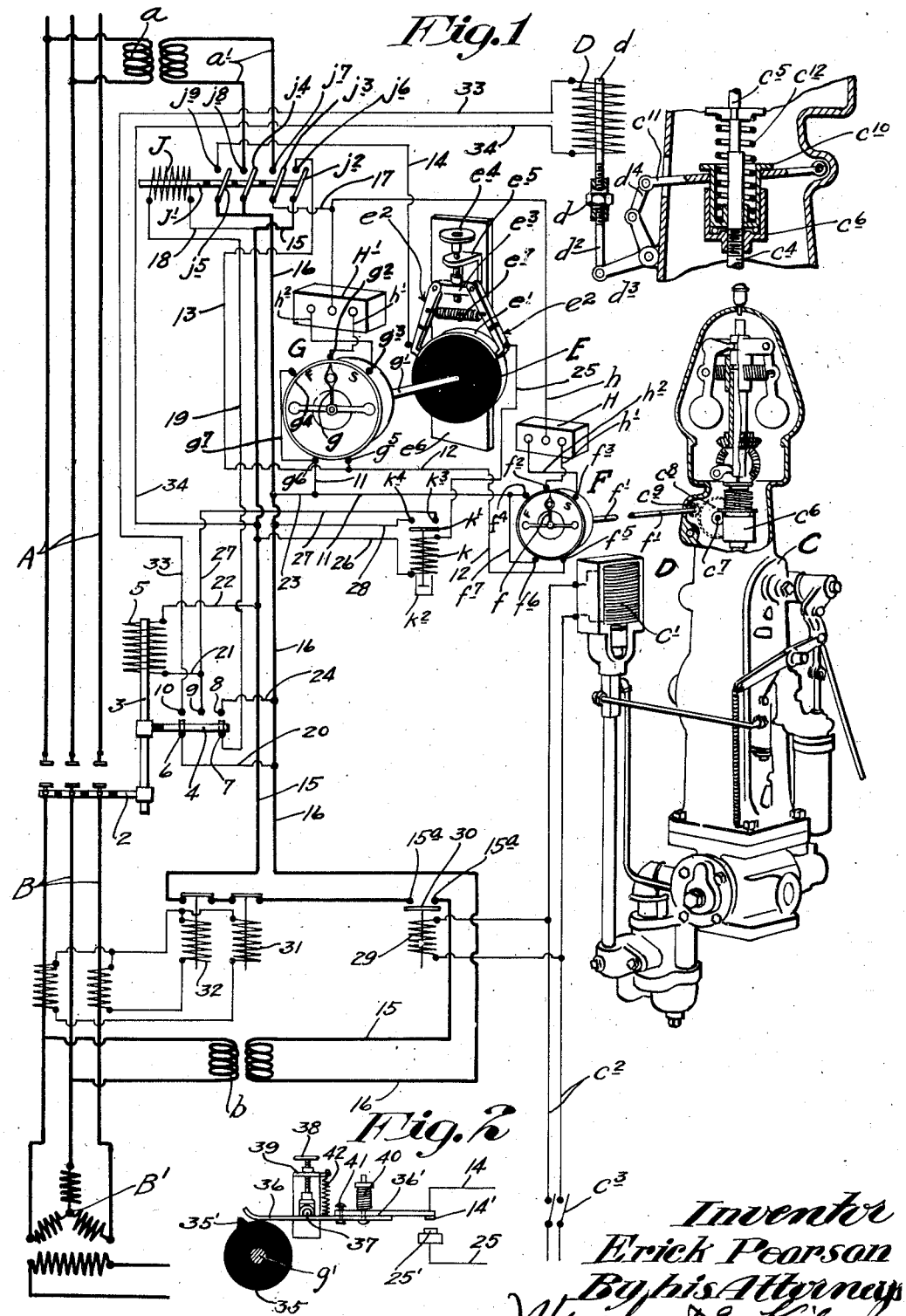

Patented Aug. 25, 1931

1,820,319

UNITED STATES PATENT OFFICE

ERICK PEARSON, OF COLUMBIA HEIGHTS, MINNEAPOLIS, MINNESOTA

AUTOMATIC SYNCHRONIZER

Application filed February 26, 1924. Serial No. 695,153.

My invention has for its object to simplify and improve the construction of automatic synchronizers for coupling into parallel synchronous alternating current machines, such as alternaters, generators, and rotary converters. The necessity for connecting alternaters or alternating current machines in synchronism is, of course, very well known. Hitherto, this has been generally accomplished by manual manipulation, but certain more or less successful automatic synchronizers have been proposed and at least one thereof, towit: that known as the Westinghouse automatic synchronizer, has been put into actual use. My improved automatic synchronizer differs from the Westinghouse synchronizer, both in its features of construction and in its principles of operation. In my invention, I make a new and important use of what is known as the synchronoscope or synchronism indicator.

A synchronoscope, as is well known, is an instrument which, when interposed between two lines, such as a supply line and a local generator line, will indicate when the generator current is in phase or approaches synchronism with the current in the main line. So far as I am aware, the main use, prior to my invention, made of the synchronoscope was that of an indicator to enable the operator to determine the proper instant at which the main or generator switch should be closed. My invention utilizes the synchronoscope as the controlling element of automatic means for closing the main line or generator switch when the phase difference is within safe limits, to wit: when the synchronism is so closely approximated that alternating machines on the two lines connected will go into step.

Preferably, I use a synchronoscope of the oscillatory or rotary type, such as the well known Westinghouse and General Electric Companies' instruments. These synchronoscopes have a rotary or oscillatory element that serves the function of an indicating pointer, and it is this or a similar element that I utilize as the primary controlling element of my improved means for automatically closing the main or generator switch at the instant of approximate synchronism.

In practice, my invention will quite generally be used in connection with a governor, which, directly or indirectly, will control the speed of the generator that is to be synchronized with the main line. For instance, the governor may be a water wheel governor that controls the water wheel, which, in turn, drives the generator. In such an arrangement, as a highly important feature of my invention, the rotary or oscillatory element of the synchronoscope is also utilized to control the governor, so that the latter will speed up or cut down the speed of the generator to the point of synchronism with the current in the main line.

As another important feature, I provide an automatic governor speed step-up device, which is automatically thrown into action when the main or generator switch is closed, and which remains in action until the generator is again cut out of action. This speed step-up device causes the generator to tend to speed up and, hence, to take its share of the load.

Another object of the invention resides in providing a synchronizing system in which the synchronizing apparatus is actuated from the electro-motive force of the generator to be connected to the line so as to prevent accidental closing of the generator switch in the event the generator fails to function.

A still further object of the invention resides in providing switch means for disconnecting the synchronizer from the generator line and distribution system, and in further providing a circuit energized by the generator for operating said switch means.

An object of the invention resides in providing means operated through the generator line switch for disconnecting the synchronizer from the generator line and distribution system.

A still further object of the invention resides in utilizing with the synchronoscope for connecting in the generator, a time controlled switch and an adjustable synchronizing switch operated by the synchronoscope for energizing the closing circuit of said time controlled switch.

The alternater or alternating current machines to be connected in synchronism may be located in the same plant or may be located many miles apart. In practice, it is customary to have at different stations several alternaters, either generators or rotary converters, or both, and to connect these to the main line from time to time, as variation in working load requires their service. In the present drawings, I have shown one three-phase alternating current generator at the local station, arranged to be connected to a three-phase main line that is supplied with current from an alternating current generator, not shown but located at a distant station.

Other objects of the invention reside in the novel combination and arrangement of parts as appear in the following specification.

I have illustrated my invention in the several views of the accompanying drawings of which Fig. 1 is a diagrammatic view showing some parts in perspective and some parts in section, and Fig. 2 is a similar view of a modification of the synchronizing switch.

In the drawings, the character A indicates the main line leads or buses and the character B indicates the primary leads from the generator B'. The leads A and B may be connected by any suitable form of generator or main switch, but in the drawings, I have illustrated a switch comprising a contact bar 2 carried by an iron rod 3 equipped also with a contact 4. The rod 3 is subject to a main switch solenoid 5. When the solenoid 5 is de-energized, the leads B will be disconnected from the leads A and the contact 4 will then be engaged with the contacts 6 and 7; but when the solenoid 5 is energized, the leads B will be connected to the leads A and the contact 4 will then be engaged with contacts 8, 9 and 10.

For our present purposes, we will assume that the generator B' is driven by a water wheel, which, in turn, is controlled by a water-wheel governor, such as that made by the Woodward Governor Company and known as the "Woodward water wheel governor". This governor is indicated as an entirety by the character C and the operation thereof is well known. For the purposes of this case, only certain parts of the governor will be particularly noted. In the first place, attention is directed to the governor-starting magnet $c^1$ that is in a starting circuit $c^2$, having a switch $c^3$. This trip magnet and circuit are of the customary arrangement, in which, when the switch $c^3$ is closed, the magnet $c^1$ will be energized, the governor will be caused to open the gate of the water wheel, not shown, and the water wheel will drive the generator B'.

Of certain other parts of the governor desirable to here note, $c^4$ is the speed-adjusting screw, $c^5$ the speed rod, $c^6$ the cup-shaped gear, which has threaded engagement with the speed screw $c^4$, $c^7$ the worm engaging the gear $c^6$, $c^8$ a gear rotatable with the worm $c^7$, and $c^9$ a pinion meshing with the gear $c^8$. In the Woodward governor, the pinion $c^9$ is arranged to be driven by a small reversible motor or by hand, the rotation in one direction of said pinion serving to set the governor for higher speed and rotation in the other direction to set the governor for lower speed. In utilizing this particular governor to carry out my invention, the pinion $c^9$ is connected to the rotary or oscillatory member of the synchronoscope, as will presently be more fully described. Also, in adapting said governor to the application of my speed step-up device, I place within the cup-shaped gear $c^6$, preferably on ball bearings, an inner cup-shaped member $c^{10}$ with a flanged upper end resting on or immediately over a lever $c^{11}$ pivotally connected at one end to the casing of the governor. In this arrangement, it is the cup-shaped member $c^{10}$, instead of the cup-shaped gear $c^6$, that supports the governor-adjusting spring $c^{12}$.

For operating the speed step-up device, I provide a solenoid D and a cooperating movable solenoid core $d$. The core $d$, as shown, is adjustably connected by a turn-buckle $d^1$ to a short rod $d^2$, which, in turn, is pivoted to a bell crank $d^3$ mounted on the governor casing and having its upper arm connected to the free end of the lever $c^{11}$ by a link $d^4$. The link $d^4$ and the upper arm of the bell crank $d^3$ act as a toggle. When the magnet D is energized, the core $d^1$ will be raised and the free end of the lever $c^{11}$ will be lifted, thereby lifting the cup $c^{10}$ and increasing the tension of the governor spring $c^{12}$, so that the governor will be set for slightly higher speed. Of course, when the magnet D is de-energized, the governor will drop back to its synchronous speed. The purpose of this speed step-up device will be further discussed in the description of operation.

As another important feature of my invention, I provide what I have herein designated as a synchronizer switch and the rotary element of which is connected to and moved by the rotary or oscillatory element of the cooperating synchronoscope. This rotary contact E is preferably of cylindrical form provided with a segmental peripheral contact strip $e^1$ that is engageable with the insulated free ends of contact arms $e^2$ pivoted to a head $e^3$, which latter is made vertically adjustable by a screw $e^4$ mounted in a bracket $e^5$ of a face plate $e^6$, to which, as shown, the contact E is journaled. Above their insulating sections, the contact arms $e^2$ are connected by a light coiled spring $e^7$. Obviously, the free ends of the contact arms $e^2$ may be spread further apart by lowering the head $e^3$ and, conversely, may be drawn nearer together by vertical adjustments of said head.

The contact E and the governor-adjusting pinion $c^9$ are both operated by the rotary or movable member of a synchronoscope. The synchronoscope may be common to both of the said devices, but to divide the work, I preferably employ two synchronoscopes, and this is the arrangement illustrated in the drawings. The synchronoscope that operates the governor pinion $c^9$ is indicated as an entirety by the character F, and the synchronoscope that operates the selecting contact E is indicated as an entirety by the character G. The character $f$ indicates the pointer or movable element of the synchronoscope F, and $f^1$ indicates a shaft that connects the rotary indicating element F to a pinion $c^9$. The character $g$ indicates the pointer or movable element of the synchronoscope G, and the character $g^1$ indicates a shaft that connects said element G to the rotary selecting contact E.

The synchronoscopes F and G illustrated are assumed to be of the type known as the General Electric synchronism indicator, Type M–3, and has the customary terminal connections $g^2$, $g^3$, $g^4$, $g^5$ and $g^6$, and the synchronoscope F, likewise, has the customary terminal contacts $f^2$, $f^3$, $f^4$, $f^5$ and $f^6$. For cooperation with the synchronoscopes F and G are resistor-reactors H and H′, the same being devices used in connection with the said General Electric Company's synchronism indicators or synchronoscopes. The intermediate terminals of these two devices H and H′ are connected by a wire $h$; the right-hand terminals are connected by wires $h^1$, respectively, to the terminals $f^2$ and $g^2$; and the left-hand terminals are connected by wires $h^2$, respectively, to the terminals $f^3$ and $g^3$. The terminals $g^4$ and $g^6$ are connected by a wire $g^7$, and the terminals $f^4$ and $f^6$ are connected by a wire $f^7$. The wires $g^7$ and $f^7$ are connected by a wire 11. The terminals $g^5$ and $f^5$ are connected by a wire 12.

In connection with synchronoscopes or synchronism indicators, I use a magnetic switch, preferably of the four-pole contact type, diagrammatically indicated in the drawing. This switch, as illustrated, comprises a solenoid or electromagnet J, a cooperating core or bar $j^1$, movable contact blades $j^2$, $j^3$, $j^4$ and $j^5$, and fixed contacts $j^6$, $j^7$, $j^8$ and $j^9$. The leads $a^1$ from the secondary coil of the transformer $a$ are connected to the contacts $j^7$ and $j^8$. The contact $j^6$ is connected by a wire 13 to the wire 12 and the contact $j^9$ is connected by a wire 14 to the end of one of the contact arms $e^2$ of the selecting switch.

The secondary coil of the transformer $b$ has leads 15 and 16, the former of which is connected to the contact blade $j^2$ and the latter of which is connected to the contact blades $j^4$ and $j^5$. The contact blade $j^3$ is connected by a wire 17 to the wire $h$, which, it will be remembered, connects the intermediate terminals of the two resistor-reactors H—H′. One terminal of the switch solenoid J is connected by a wire 18 to the lead 15, and the other terminal of said solenoid is connected by a wire 19 to the contact 7 of the main or generator switch. Normally, the contact 7 is connected to the contact 6 by the arm 4 of the said generator switch. The contact 6 is connected to the lead 16 by a wire 20.

One lead of the solenoid 5 of the main or generator switch is connected by a wire 21 to the switch contact 9, and the other terminal of said solenoid is connected by a wire 22 to the lead 16. Said lead 16 is also connected by a wire 23 to the wire 11, which, it will be remembered, connects the synchronoscope contacts $g^4$ and $g^6$ with the synchronoscope contacts $f^4$ and $f^6$. The main switch contact 8 is connected by a wire 24 to the lead 16.

As a very important feature, I use in connection with the selecting switch and the cooperating synchronoscope, a time limit quick return relay switch, which may be substantially of the type sold by the General Electric Company as their Standard Unit Type P—Q circuit-closing inverse time limit relay, and which comprises a solenoid or coil $k$, a cooperating piston-equipped movable contact $k^1$, and a dash pot $k^2$. One terminal of the coil $k$ is connected by a wire 25 to the free end of the right-hand contact arm $e^2$ of the selecting switch, and the other terminal of said coil is connected by a wire 26 to the lead 15. Normally, the movable contact $k^1$ is out of engagement with fixed contacts $k^3$ and $k^4$. The contact $k^3$ is connected by a wire 27 to the wire 21, and the contact $k^4$ is connected by a wire 28 to the lead 16. Interposed in one of the leads 15—16, as shown in said lead 15, is a normally open quick-acting relay switch comprising a coil 29 and a cooperating movable contact 30. The coil 29 is connected across the starting circuit $c^2$ and when the coil 29 is de-energized, the contact 30 is slightly below spaced contacts 15a of the lead 15.

The numerals 31 and 32 indicate standard overload time limit relays, which normally close the lead 15, but in case of overload, break or open said lead. The action of these devices is well understood, and as they constitute no essential part of the present invention, are here but briefly described.

It may now be noted that one terminal of the solenoid or coil D of the governor speed step-up device is connected by a wire 33 to the main switch contact 10, and that the other terminal of said contact is connected by a wire 34 to the lead 15.

In the modified construction illustrated in the fragmentary diagram view, Fig. 2, the wires 14 and 25 are connected, respectively, to contacts 14' and 25', and the shaft $g^1$, which, as before described, is connected to the movable member $g$ of the synchronoscope G, carries a disc 35 of insulating material, provided with a cam projection 35'. The cam projection 35' engages the free end of a lever 36 pivoted to a bearing 37 that is made vertically adjustable by a screw 38 having threaded engagement with a supporting bracket 39. The lever 36 has a flexible connected extension 36' connected thereto by a spring-equipped pin 40 and a loose rivet 41 and it is to the free end of said extension 36 that the contact 14' is connected. A light coiled spring 42, connected to the lever 36 and to the bearing 39, yieldingly holds said lever in the position shown in Fig. 2, with the contact 14' separated from the contact 25'.

The operation of this selecting switch is much like that illustrated in Fig. 1. The cam projection 35' will hold the contact 14' engaged with the contact 25', thereby closing the circuit through the coil $k$ of the time limit relay when the indicating element $g$ of the synchronoscope G is substantially in the intermediate position shown in Fig. 1, and during an interval of time depending upon whether or not the two alternater circuits are substantially in synchronism, and the circuits will be operated as hereinafter described to cause the main switch to connect the two alternater circuits only when the phase differences in the two circuits are within safe limits for coupling.

*Operation*

The normal position or position of rest of all of the parts is illustrated in the drawings. The starting circuit $c^2$ may lead from any distant station and its controlling switch $c^3$ may be located at the local station or at a remote station, and may be operated at will or automatically in any suitable way, so far as this invention is concerned. When the starting switch $c^3$ is closed, the starting magnet D will be energized, the governor will be operated to start the water wheel or other source of supply, and the generator B' will be thrown into action. Also at the instant of closing the starting circuit $c^2$, the starting magnet solenoid 29 will be energized and the contact 30 will be moved into engagement with the contacts 15$^a$, thereby closing the circuit through the solenoid J of the synchronizing switch, so that said switch will be operated as soon as the current in the leads 15 and 16 is built up to normal voltage.

When the solenoid J is energized and the contact bar J' is moved toward the left, so as to close the synchronizing switch, the contact blades $j^2$, $j^3$, $j^4$ and $j^5$ will be engaged, respectively, with the contacts $j^6$, $j^7$, $j^8$ and $j^9$, and the closed circuits to the synchronoscopes F and G will be as follows:

From the right-hand lead $a^1$ of the main line transformer $a$ through the contact blade $j^3$, wire 17, wire $h$, and wires $h^1$ and $h^2$ to the contacts $f^2$ and $f^3$ and the contacts $g^2$ and $g^3$ of the synchronoscopes F and G; the left-hand lead $a^1$ is connected through the switch blade $j^4$, a portion of the lead 16, the wire 23, and the wires $g^7$ and 11 to the contacts $g$ and $g^4$ of the synchronoscope G and to the contacts $f^6$ and $f^4$ of the synchronoscope F; and the said contacts $g^4$ and $g^6$ and $f^4$ and $f^6$ are also then connected in circuit with the secondary coil of the transformer $b$ through the lead 15. Also, at the same time, the circuit from the lead 15 is closed as follows: Through the contact blade $j^2$, wire 13, to the wire 12, and thence to the terminals or connections $g^5$ and $f^5$ of the synchronoscopes F and G. This connects the two synchronoscopes, so that they will indicate the phase relation between the current from the transformers $a$ and $b$, and at such time, of course, the movable indicators or elements $f$ and $g$ of the said instruments will rotate in the one direction or the other, according to the variation in the phase relation. When synchronism is closely approached or approximated, the said pointers, indicators, or elements $f$ and $g$ will move very slowly past the zero point or may hover around said point and, of course, the rotary member E of the synchronizer switch will be given the same rotary motion as the indicator element $g$ of the cooperating synchronoscope G. Each time that the segmental contact $e^1$ simultaneously contacts with the tips of the contact arms $e^2$, the circuit through the coil or solenoid $k$ of the time limit relay will be closed across the leads 15 and 16 through the following connections, towit: from the lead 16 through the switch blade $j^5$, wire 14, left-hand contact arm $e^2$, contact segment $e^1$ right hand contact arm $e^2$, wire 25, solenoid $k$, and wire 26, back to the lead 15. When the two lines are out of synchronism, the movable element $g$ will rotate in the one direction or the other, but as synchronism is approximately reached or is within safe limits for coupling, the said element $g$ and, hence, the contact-carrying member E will move very slowly or may come to a standstill at or near the zero mark.

As noted, the time limit relay coil $k$ will be energized only while the segmental contact $e^1$ is engaged with both contact levers $e^2$. When the elements $e$ and $g$ are rotated or moved by the two-line circuits when materially out of synchronism or outside of the safe variation for coupling, the closing of the circuit will not be sufficiently long to cause said coil $k$ to move the contact $k^1$ into engagement with the contacts $k^3$ and $k^4$, but when the appropriate synchronism or synchronism within the safe limit for coupling is reached, the time of closing of said circuit will be lengthened, so that said coil $k$ will bring the contact $k^1$ into engagement with said contacts $k^3$ and $k^4$, and this will close the circuit 22, 21, 27 and 28 through the main switch solenoid or magnet coil 5. When the solenoid 5 is thus energized, the main switch core 3 will be moved, thereby closing the main line switch between the line wires A and B. Said movement of the main switch also carries the contact 4 out of engagement with the contacts 6 and 7 and into engagement with the contacts 8, 9 and 10; but it should be noted that the said contacts 6 and 7 are extended under the movable contact bar 4, so that the latter maintains electrical contact therewith until it has effected initial engagement with the contacts 8, 9 and 10, and immediately following the engagement with said contacts 8, 9 and 10, the bar 4 disengages from the contacts 6 and 7. When the contact bar 4 engages said contacts 8, 9 and 10 as just stated, the magnet 5 will then be energized through a closed circuit, including the lead 16, the wire 24, the contact 8, the contact bar 4, the contact 9, the wire 21, and from the coil through the wire 22 to the lead 15; but opening of the circuit between the contacts 6 and 7 will open the circuit to the synchronizer switch magnet J, so that said switch will reassume its open position shown in the drawings, thereby opening all of the synchronizer circuits. However, the engagement of the contact bar 4 with said contacts 8, 9 and 10, as just described, closes the circuit of the speed step-up solenoid D from the lead 16 through the wires 24, bar 4, wire 33, and wire 34 to the lead 15. When the solenoid D is energized, the core $d$—$d^2$ will be raised, thereby rocking the bell crank $d^3$ and lifting the level $c^{11}$ and the cup $c^{10}$, so as to increase the tension of the governor spring $c^{12}$, which, in turn, reacts against the speed rod $c^5$. When the tension of the spring 12 is thus increased, it will tend to accelerate the speed of the governor and of the source of power and, consequently, will cause the generator B′ to take its share of the load. The extent to which this acceleration will be given may be varied by adjustments of the turnbuckle $d^1$. Hence, several units, when running together, can all be adjusted so that each will take its proper proportion of the load. When it is desired to throw the generator B′ out of action, the starter switch $c^3$ will be opened, thereby immediately de-energizing the magnets $c^1$ and 29. De-energization of the magnet $c^1$ causes the governor to close the gate or cut off the generator-driving power, and de-energization of the magnet 29 will permit the contact 30 to drop and thereby open the circuit including the leads 15 and 16 and all circuits deriving energy therefrom, and this will cause the main or generator switch to drop back to its normal position shown in the drawing, thereby opening the switch between the line A and B. The opening of the circuits just noted included opening of the circuit to the speed step-up magnet D, so that the latter will then be de-energized, permitting the lever $c^{11}$ to drop back and restore the governor spring $c^{12}$ to that tension that sets the generator for synchronous speed with no load.

Another important action that was taking place during all of the above described synchronizing actions will now be noted, towit: The movable indicator element $f$ of the synchronoscope F, as is evident, was given movements corresponding to the movements given to the indicator element $g$ of the synchronoscope G, and as said element $f$ is connected by the shaft $f^1$ to the speed-adjusting pinion $c^9$ of the governor, said pinion will be rotated in the one direction or the other, depending upon whether the governor is driving the generator at too high or too low speed. If the governor is driving the generator above the speed for synchronism with the main line, then the synchronoscope F will tend to rotate the indicator $f$, the shaft $f^1$, and the speed pinion $c^9$ in a direction to cause the governor to slow down the governor speed; but on the other hand, if the governor is driving the generator below synchronous speed, then the indicator $f$, shaft $f^1$, and the pinion $c^9$ will tend to rotate in the opposite direction, towit: in a direction to cause the governor to speed up the generator. When the generator is being driven at a speed substantially in synchronism with the main line or within safe limits for coupling, then the indicator $f$, shaft $f^1$ and speed pinion $c^9$ will be given little or no motion, and attention is now called to the fact that it was at such time that the main or generator switch was automatically closed under the control of the synchronoscope G, acting as already described.

In the drawings, I have illustrated more or less in detail certain devices for performing certain functions, but it will, of course, be understood that all of these devices are capable of a large range of modification within the scope of my invention as herein disclosed and claimed. In fact, all of the devices shown in the drawing are disclosed only for illustrative purposes. The various switches and instruments necessary for carrying out my invention can be found on the market, with the exception of the selecting switch and the governor speed step-up device, and both of these devices are capable of a large range of modification. As already pointed out, the combination of synchronoscope and synchronizer switch or contact-making device into combinations thereof with the other elements disclosed, constitute a radical departure from the prior art and are herein broadly claimed. The use of the synchronoscope for adjusting the governor or speed-regulating device is also considered a broadly new feature and is herein generically claimed. Also, the governor speed step-up device, including the solenoid or electromagnet and cooperating means for quickly adjusting the tension of the governor speed-regulating spring, is considered broadly new and is herein broadly claimed.

A synchronoscope, as is known, is an instrument that responds to varying phase between two energized circuits, and it should be understood that this term is herein used in that generic sense.

What I claim is:

1. In combination, an alternating current distribution system, a generator adapted to supply electrical power thereto, means for synchronizing said generator with said distribution system, circuits connected to said system and generator for operating said synchronizing means, switches in said circuits, and a circuit for closing said switches, said circuit being energized by said generator.

2. In combination, an alternating current distribution system, a generator adapted to supply electrical power thereto, means normally inoperative for synchronizing said generator with said distribution system, and a circuit for rendering said synchronizing means operable, said circuit being energized by said generator.

3. In combination, an alternating current distribution system, a generator adapted to supply electrical power thereto, a switch for connecting said generator with said distribution system, a circuit for closing said switch, a time controlled switch in said circuit, a synchronizing device, a circuit for operating said time controlled switch, a momentarily actuated switch, operated by said synchronizing device and disposed in said last named circuit, said switch including a contact member of fixed extent and a second contact member movable along said first named contact member and having portions thereof movable toward and from one another and means for adjusting the portions of said second named contact member for varying the duration of contact of said momentarily actuated switch.

4. In combination, an alternating current distribution system, a generator adapted to supply electrical power thereto, means normally inoperative for synchronizing said generator with said distribution system, switch means for connecting said generator with said system, means operable by said synchronizing means for closing said switch means and means dependent upon the potential of said generator for rendering said synchronizing means operable.

5. In combination, an alternating current distribution system, a generator adapted to supply electrical power thereto, means for synchronizing said generator with said distribution system, circuits connected to said system and generator for operating said synchronizing means, switches in said circuits, a circuit for closing said switches, a switch for connecting the generator to the distribution system, and means operated by said last named switch for making and breaking said last named circuit.

6. In combination, an alternating current distribution system, a generator adapted to supply electrical power thereto, means for synchronizing said generator with said distribution system, circuits connected to said system and generator for operating said synchronizing means, switches in said circuits, a circuit for closing said switches, a switch for connecting the generator to the distribution system, and means operated by said last named switch for making and breaking said last named circuit, said last named circuit being energized by said generator.

7. In combination, an alternating current distribution system, a generator adapted to supply electrical power thereto, a synchronizer connected to said generator and to said distribution system, a switch for connecting said generator with said distribution system, a movable member for operating said switch, switch means for disconnecting said synchronizer from said generator and distribution line, and means operable by said movable member for operating said switch means.

In testimony whereof I affix my signature.

ERICK PEARSON.